F. M. GIFFEN.
ELECTRIC SOLDERING IRON.
APPLICATION FILED JULY 17, 1912.
1,061,170.
Patented May 6, 1913.
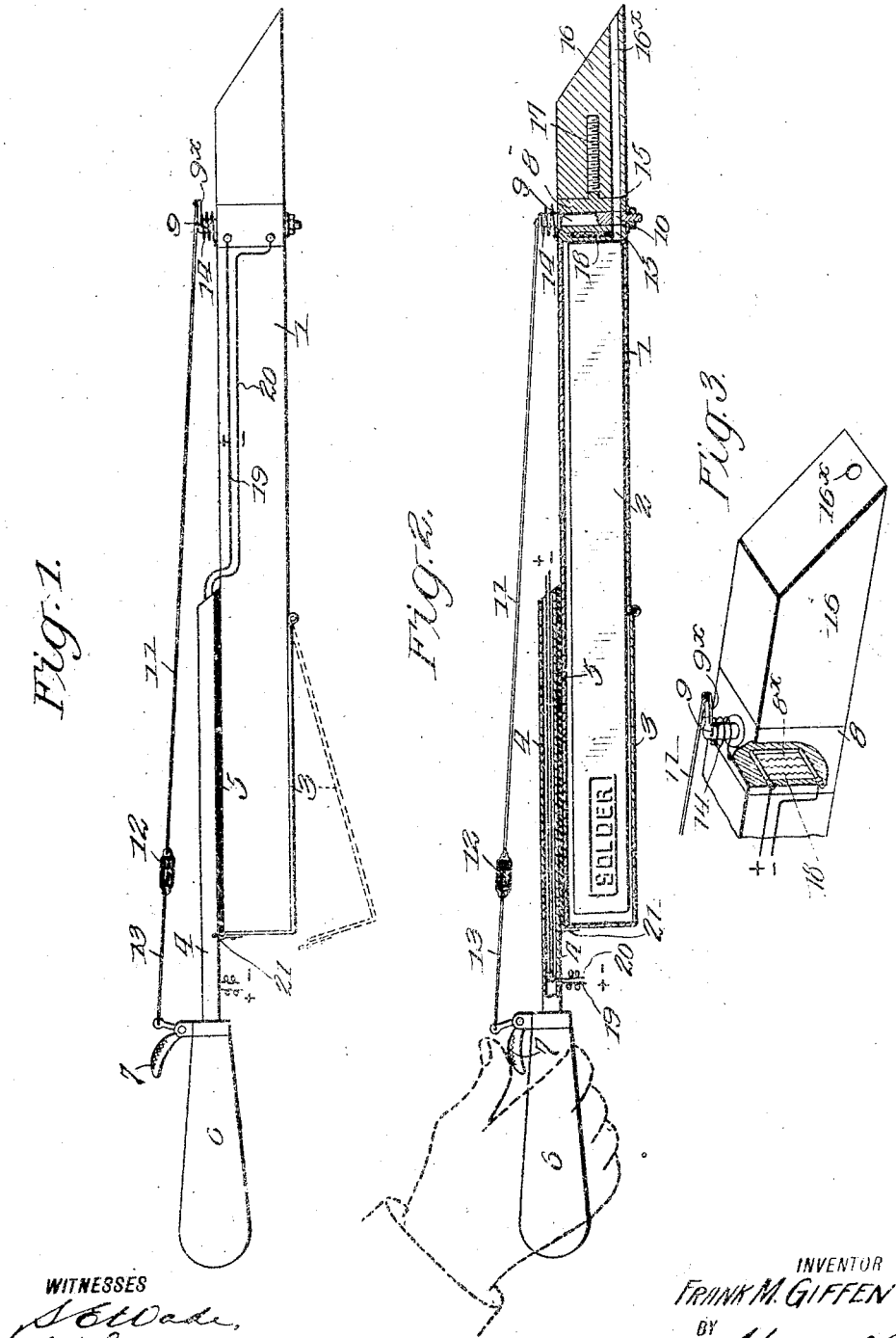
WITNESSES
INVENTOR
FRANK M. GIFFEN
BY
ATTORNEYS

UNITED STATES PATENT OFFICE.

FRANK M. GIFFEN, OF SAN ANTONIO, TEXAS.

ELECTRIC SOLDERING-IRON.

1,061,170.

Specification of Letters Patent.

Patented May 6, 1913.

Application filed July 17, 1912. Serial No. 709,893.

*To all whom it may concern:*

Be it known that I, FRANK M. GIFFEN, a citizen of the United States, and a resident of San Antonio, in the county of Béxar and State of Texas, have invented a certain new and useful Improvement in Electric Soldering-Irons, of which the following is a specification.

My invention relates to improvements in electric soldering irons, and it consists in the combinations, constructions and arrangements herein described and claimed.

An object of my invention is to provide a soldering iron having a receptacle for the solder from which the melted solder may be delivered as desired.

A further object of my invention is to provide novel means for permitting the flow of solder and for shutting it off.

Other objects and advantages will appear in the following specification, and the novel features of the device will be particularly pointed out in the appended claims.

My invention is illustrated in the accompanying drawings in which—

Figure 1 is a side view of the device; Fig. 2 is a longitudinal section; and Fig. 3 is a perspective view of one end of the device.

In carrying out my invention I provide an elongated receptacle 1 for the bar of solder 2. This receptacle is provided at one end with a hinged end 3. Secured to one end of the receptacle above the latter is a hollow rod 4 which forms part of the handle, suitable insulation 5 being interposed. A wooden handle portion 6 is provided which bears a thumb lever 7. At the opposite end of the receptacle and forming in fact one end thereof, is a metal member 8 which is provided with an opening in which is a rod 9 provided with an opening 10. This rod is arranged to rotate on its axis and has a laterally extending arm $9^x$ to which is attached a small bar or rod 11. An insulating member 12 is interposed between the rod 11 and a similar rod 13 which is connected to a portion of the thumb lever 7. A spring 14 is provided for keeping the opening 10 normally out of alinement with the openings 15 in the member 8. A copper bar 16 is secured upon an integral portion 17 of the member 8. This copper bar is provided with a passage $16^x$ which registers with the opening 15 in the member 8. The member 8 is provided with a recess $8^x$ in which is disposed a resistance or heating element 18. The latter is connected to the wires 19 and 20 which pass rearwardly through the hollow member 4 where they merge near the wooden portion 6.

From the foregoing description of the various parts of the device the operation thereof may be readily understood. The solder is inserted within the receptacle 1 by unfastening the hinged end 3 which may be closed and which is held in place by means of the latch 21. The ends of the wires 19 and 20 are attached to any convenient source of current of the required voltage. The resistance element 18 will cause the heating of the metal member 8 which will heat the copper end 16 and also the solder 2 when the latter will begin to melt.

Pressure on the thumb lever 7 will cause the rotation of the rod 9 so as to bring its opening 10 into alinement with the opening 15. The solder will thereupon run out through the passage $16^x$ to the place where it is to be applied. When the thumb lever 7 is released the spring 14 will cause the turning of the rod 9 so as to shut off the flow of solder. The tool may be turned over so as to work on the beveled end of the copper portion 16 or it may be held in the position shown in Fig. 2 when soldering the under side of tin work or gutters or the like. As fast as the solder melts it can be brought into contact with the metal member 8 by inclining the tool. It will be understood that the rod 9 which forms the valve member and which is operated by means of the thumb lever is loose enough to turn freely even when the member 8 is heated to the degree necessary for successful operation of the device.

I am aware that other devices based on the same general plan might be made but I consider as my own all such modifications as fairly fall within the spirit and the scope of the invention.

I claim:—

1. In an electric soldering iron, a receptacle for a bar of solder provided with a hinged end, a copper soldering point or end, a heating element disposed between said copper end and said receptacle, said heating element comprising a metal body portion having a recess, and resistance elements disposed within said recess, said copper end being provided with a passage arranged to communicate with the interior of said receptacle, a valve carried by said heating element, a spring for keeping the valve normally closed, a handle, a thumb lever carried by said handle, and connections between said thumb lever and said valve for operating the latter.

2. In an electric soldering iron, a receptacle for a bar of solder provided with a hinged end, a metal heating element adjacent one end of said receptacle, a copper soldering point adjacent to the metal heating element, said metal heating element and said copper point being provided with registering passages for conducting the liquid solder to the exterior of the soldering iron, a rotary valve carried by said heating element and provided with an opening adapted to register with the openings in the heating element, a spring for keeping the valve normally closed, a handle, a thumb lever carried by said handle, and a rod connected with said thumb lever at one end and said valve at the other end for operating the valve to permit the flow of the melted solder.

FRANK M. GIFFEN.

Witnesses:
EMILY A. EMERSON,
LEO. TARLETON.